2,814,573

ORGANIC POLYMERIC COMPOSITIONS CONTAINING NITRILO METHYLOL-PHOSPHORUS POLYMERS AND BROMINE COMPOUNDS

Wilson A. Reeves, Carl Hamalainen, and John D. Guthrie, New Orleans, La., assignors to the United States of America as represented by the Secretary of Agriculture No Drawing. Application November 9, 1954, Serial No. 467,899

6 Claims. (Cl. 117—136)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to reducing the flammability of organic textiles. More particularly, the invention provides textile treating compositions adapted to incorporate the elements phosphorus, nitrogen, and bromine into organic textiles in a manner and amount in which the elements coact to materially reduce the flammability of the textile.

Prior work has resulted in the development of a variety of polymers capable of being produced by condensation and/or esterification reaction involving tetrakis(hydroxymethyl)phosphonium chloride, which has the formula $(HOCH_2)_4PCl$, and is abbreviated THPC, and/or tris-(hydroxymethyl)phosphine oxide, which has the formula $(HOCH_2)_3PO$, and is abbreviated THPO. The methylol-phosphorus, $PCH_2OH$ groups, of each of these compounds are capable of either: (1) condensing with a compound which is capable of condensing with formaldehyde; or, (2) being esterified by an esterifying agent which is capable of esterifying methanol. Compounds of the group, THPC, THPO, and derivatives of either of them which contain a plurality of methylol-phosphorus groups of the parent compounds, are hereinafter referred to by the term "phosphorus compounds."

The polymers capable of being produced by condensation and/or esterification reactions of the phosphorus compounds can be produced in the form of cross-linked polymers or thermosetting resins; and, hereinafter, these polymers are referred to by the term "methylol-phosphorus" polymers or resins. The compounds capable of either condensing with formaldehyde or esterifying methanol are hereinafter referred to by the term "methylol-reactive compounds."

The methylol-phosphorus polymers are characterized by recurring structural units containing phosphorus atoms in radicals of the group $(—CH_2)_4PCl$ and $(—CH_2)_3PO$. Methylol-phosphorus alkyds are produced by reacting at least one of the phosphorus compounds with at least one polycarboxylic acid esterifying agent. Phenolic methylol-phosphorus polymers are produced by reacting at least one of the phosphorus compounds with at least one phenolic compound.

Certain nitrogen containing methylol-phosphorus polymers, which are hereinafter referred to as "nitrilo" methylol-phosphorus polymers or resins, are particularly useful as textile flammability retardants. These resins are adapted to being partly or completely formed within the textile by impregnating the textile with an aqueous solution or dispersion of their resin forming reactants, and causing the reactants to react in situ until an insolubilized resin is produced. The nitrilo methylol-phosphorus polymers are capable of being produced by condensing at least one of the phosphorus compounds, with the elimination of water, with at least one organic nitrogen compound having a molecular weight of not more than about 800 and containing at least one trivalent nitrogen atom and at least two members of the group H and $CH_2OH$ attached to trivalent nitrogen atoms. This class of organic nitrogen compounds is hereinafter referred to by the term "nitrogen compounds." Methods of producing the nitrilo methylol-phosphorus polymers and employing them to reduce the flammability of textiles are more completely described in copending patent applications, Serial No. 378,437 filed September 3, 1953; Serial No. 393,021 now Patent 2,772,188, and Serial No. 393,023 now Patent 2,795,569 filed November 18, 1953. The nitrilo methylol-phosphorus polymers are cross-linked phosphorus and nitrogen containing polymers in which the recurring structural units each contain a phosphorus atom that is a component of a radical of the group $(—CH_2)_4PCl$ and $(—CH_2)_3PO$ and is linked to at least two trivalent nitrogen atoms by connecting structures of the group $—CH_2—$ and $—CR_2OCR_2—$ where R is a member of the group hydrogen and alkyl radicals.

While the nitrilo methylol-phosphorus polymers are particularly good textile flammability reducing agents, the production of such an agent which imparts the maximum reduction in textile flammability per part of resinous impregnant is one of the goals being sought in the field of imparting flame resistance to textile materials.

A primary object of the present invention is to provide improved nitrilo methylol-phosphorus textile flammability reducing compositions in which the desirable properties characteristic of the nitrilo methylol-phosphorus compositions (properties such as causing only a slight reduction in hand, feel, tear strength, and the like desirable textile properties) are retained and augmented by the incorporation of certain bromine containing materials.

Heretofore, the efficiency of the nitrilo methylol-phosphorus polymers (the amount of flame resistance imparted per unit weight of resin) seemed to be substantially completely dependent upon the amount and ratio of nitrogen and phosphorus contained in the polymers. The presence or absence of halogen seemed to exert little, if any, effect upon the efficiency. For example, a nitrilo methylol-phosphorus polymer produced under conditions yielding a polymer containing from about 1 to 12% chlorine exhibits substantially the same efficiency as one containing the same amount and ratio of nitrogen and phosphorus, produced under conditions yielding a substantially halogen free polymer, whereas one containing an appreciably different amount or ratio of nitrogen and phosphorus exhibits an appreciably different efficiency.

We have now discovered that when nitrilo methylol-phosphorus polymers having a nitrogen and phosphorus content within certain ranges of both amount and nitrogen-to-phosphorus ratios are mixed with a certain proportion of non-volatile compositions containing firmly attached bromine, the resulting compositions exhibit a flame reducing efficiency which is materially greater than that of compositions which differ only in the absence of the bromine containing compositions.

In general, in accordance with the present invention, a homogeneous polymeric mixture is formed by mixing at least one nitrilo methylol-phosphorus polymer and at least one organic material containing at least 10% of bromine in the form of bromine atoms attached to carbon atoms in proportions selected so that phosphorus contained in structures of the group $(—CH_2)_4PCl$ and $(—CH_2)_3PO$ amounts to at least 3% of the total weight of the mixture and from about 0.5 to 15 parts of nitrogen contained in nitrilo groups and from 0.5 to 15 parts of bromine in the form of bromine atoms attached to carbon atoms are present per part of said phosphorus.

Throughout the specification and claims, the term "parts" and "percent" are used only to refer to parts or percent by weight.

The nitrilo methylol-phosphorus polymers can be formed in the polymeric mixture, for example, by mixing the bromine containing compound with resin forming reactants of the nitrilo methylol-phosphorus polymer and converting the reactants to a polymer in situ.

The bromine containing polymeric mixtures provided by this invention can be produced in the form of liquid or solid compositions. They are homogeneous mixtures characterized by a particularly high resistance to burning and the property of imparting high degree of resistance to burning to other materials. These mixtures are generally useful wherever mixtures predominating in cross-linked polymers are useful. Illustrative examples include their use in the production of molded synthetic plastic articles such as buttons, containers, electrical insulators and the like; synthetic coatings such as paints, varnishes, and the like; adhesives; and impregnating agents for textiles, ropes, paper and the like.

These bromine containing polymeric mixtures are particularly suited for use in the impregnation of organic textiles to reduce their flammability. These mixtures can be used in the treatment of vegetable textile materials such as cotton, flax, linen, ramie, and the like, chemically modified vegetable textile materials such as cyanoethylated, carboxymethylated, aminoethylated cottons and the like; regenerated cellulosic textiles such as the viscose rayons; or proteinaceous textiles such as silk, wool, and the like. The textile materials can be treated in the form of slivers, yarns, threads, or fabrics. The polymers contained in the mixtures can be separately formed or can be produced in situ in the textile by a reaction of materials with which the textile is impregnated. The mixtures can be used as the only material with which the textile is impregnated or used in conjunction with other textile flameproofing, creaseproofing, wrinkleproofing and the like textile treating agents; or in conjunction with textile lubricants, water repellents, and the like textile treating agents.

The bromine containing compositions which can be mixed with the nitrilo methylol-phosphorus polymers to provide the polymeric mixtures of the present invention comprise non-volatile compositions which are unreactive toward cellulosic materials, nitrilo methylol-phosphorus polymers, and nitrilo methylol-phosphorus resin forming reactants, and are compositions containing at least about 10% of bromine in the form of bromine atoms attached to carbon atoms.

One preferred class of such bromine containing compositions comprises the polybromo alcohol neutral esters of phosphonitrilic halides. Illustrative examples of such esters include the 2,3-dibromopropyl esters of the phosphonitrilic chlorides, and the like esters, disclosed in U. S. Patent No. 2,681,295.

Another preferred class of such bromine containing compositions comprise those of the polymeric addition products of (a) $C_{1-2}$ polyhalohydrocarbons containing at least two atoms of the group bromine and chlorine attached to the same carbon atom and (b) terminally unsaturated alkenol esters of phosphorus nitrilic halides which are addition products containing at least about 10% bromine. Such addition products are capable of being produced by a free radical initiated reaction between the components of a mixture of reactants consisting of at least one of the groups, (a) a polymerizable terminally unsaturated alkenol ester of a phosphonitrilic halide and (b) a polybromohydrocarbon of the group

and

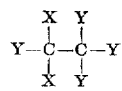

in which X represents bromine and Y represents bromine, chlorine, or hydrogen; in which mixture the reactants and the proportion in which they are mixed are selected so that the mixture contains at least about 10% of bromine in the form of bromine atoms attached to carbon atoms; with said reaction being conducted until the resulting polymeric addition product contains at least about 10% bromine. Suitable processes of producing typical members of such polymeric addition products are described in more detail in copending application Serial No. 467,900, filed of even date. Terminally unsaturated alkenol esters of phosphorus nitrilic halides which are particularly useful in producing such polymeric addition products include the allyl esters of the tri- and tetrameric phosphonitrilic chlorides, bromides, and the like. Terminally unsaturated $C_{3-5}$ alkenol esters of the lower polymeric phosphonitrilic chlorides are particularly preferred. Polybromohydrocarbons which are particularly useful in producing such polymeric addition products include bromoform, carbon tetrabromide, and the like. Polybromomethanes are preferred polybromohydrocarbons.

Another preferred class of bromine containing materials, comprises those of the analogous polymeric addition products of terminally unsaturated N-alkenylated melamines which contain at least about 10% bromine in the form of bromine atoms attached to carbon atoms and which are free of methylol reacting groups. Such polymeric addition products are capable of being produced by a free radical initiated addition reaction between the components of a mixture of reactants consisting of at least one member of each of the first two groups, (a) a polymerizable terminally unsaturated alkenylated melamine of the formula

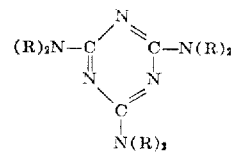

in which R represents a lower alkyl radical or a terminally unsaturated alkenyl radical, and at least two of the latter radicals are present in each compound, (b) a polybromo hydrocarbon of the class

and

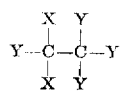

as defined above, and (c) from 0 to 20% of the combined weight of (a) and (b) of a lower aliphatic aldehyde; in which mixture the reactants and the proportion in which they are mixed are selected so that the mixture contains at least about 10% of bromine in the form of bromine atoms attached to carbon atoms; with said reaction being conducted until the resulting polymeric addition product contains at least about 10% bromine. Terminally unsaturated N-alkenylated melamines, which can be used in the production of such polymeric addition products include N,N-diallyl melamine, N,N-diallyl methylolmelamine, N,N'-tetra-allylmelamine and the like. The terminally unsaturated N-alkenylated melamines containing from about 2 to 6 $C_{3-5}$ alkenyl radicals are preferred, the allylic melamines being particularly preferred. Polybromo hydrocarbons which can be used in producing such polymeric addition products include bromoform, carbon tetrabromide, and the like. The polybromomethanes are preferred polybromohydrocarbons.

Another preferred class of bromine containing compositions comprises the polymeric addition products of polybromo hydrocarbons and polymerizable aliphatic acrylamides which addition products contain at least about 10% of bromine in the form of bromine atoms attached to carbon atoms. Such addition products are capable of being produced by a free radical initiated addition reaction between the components of a mixture of reactants consisting of at least one member of each of the first two groups, (a) polymerizable compounds of the formula

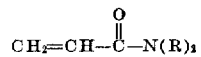

in which R represents a lower alkyl radical or

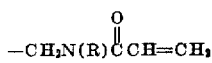

(b) a polybromohydrocarbon of the class

and

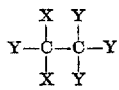

as defined above and (c) from 0 to 20% of the combined weight of (a) and (b) of a lower aliphatic aldehyde; in which mixture the reactants and the proportion in which they are mixed are selected so that the mixture contains at least about 10% of bromine in the form of bromine atoms attached to carbon atoms; with said reaction being conducted until the resulting polymeric addition product contains at least about 10% bromine. Aliphatic acrylamides which can be used in the production of such polymeric addition products include N,N'-methylenebis-acrylamide, and the like. Acrylamide and methylenebis-acrylamides are particularly preferred. Polybromohydrocarbons which can be used in the production of such polymeric addition products include bromoform, carbon tetrabromide, and the like. The polybromomethanes are preferred polybromohydrocarbons.

Suitable processes of producing typical members of the addition products of both the N-alkenylated melamines and the aliphatic acrylamides with polybromohydrocarbons are described in greater detail in copending application Serial No. 467,898, filed of even date.

Another preferred class of bromine containing materials comprises the polymeric addition products of polybromohydrocarbons and polymerizable trialkenyl phosphates which addition products contain at least about 10% of bromine in the form of bromine atoms attached to carbon atoms. Such polymeric addition products are capable of being produced by a free radical initiated addition reaction between the components of a mixture of reactants consisting of at least one member of each of the groups, (a) polymerizable alkenyl phosphates of the formula

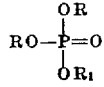

in which R represents an alkyl radical or a terminally unsaturated alkenyl radical and $R_1$ represents a terminally unsaturated alkenyl radical, and (b) a polybromohydrocarbon of the class

and

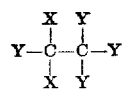

as defined above; in which mixture the reactants and the proportions in which they are mixed are selected so that the mixture contains at least about 10% of bromine in the form of bromine atoms attached to carbon atoms, with said reaction being conducted until the resulting polymeric addition product contains at least about 10% bromine. Trialkenyl phosphates which can be used in the production of polymeric addition products include triallyl phosphate, trimethallyl phosphate, and the like. Terminally unsaturated $C_{3-5}$ trialkenyl phosphates are preferred, the allylic phosphates are being particularly preferred. Polybromohydrocarbons which can be used in the production of such polymeric addition products include bromoform, carbon tetrabromide, dibromodichloromethane and the like. The polybromomethanes are particularly preferred. Suitable processes of producing typical members of such polymeric addition products are described in greater detail in copending application Serial No. 403,943, now Patent 2,778,747 filed January 13, 1954, and U. S. Patents Nos. 2,686,768 and 2,686,769.

Other suitable bromine containing materials include these brominated polymers of triallyl phosphate and the like bromine containing polymers of unsaturated phosphates described in U. S. Patent Nos. 2,660,524 and 2,660,543, and the like materials which contain at least about 10% of bromine in the form of bromine atoms attached to carbon atoms.

Preferred nitrilo methylol-phosphorus polymers comprise those produced by reacting reactants of the group, phosphorus compounds and polyfunctional nitrogen compounds, selected so that phosphorus contained in phosphorus compounds amounts to at least about 0.5% of the total weight of the reaction mixture and so that from about 1.0 to 2.0 parts of nitrogen contained in nitrogen groups are present per 1 part of phosphorus contained in phosphorus compounds.

A portion of the bromine contained in the polymeric mixtures provided by the present invention can be contained in the nitrilo methylol-phosphorus polymer. Bromine containing nitrilo methylol-phosphorus polymers can be produced by reacting reactants of the group phosphorus compounds, polyfunctional nitrogen compounds, and polyfunctional methylol reacting compounds. A process of producing such bromine containing nitrilo methylol-phosphorus polymers is described in greater detail in copending application Serial No. 467,898 filed of even date.

While the phosphonium salt phosphorus compounds used in the production of the nitrilo methylol polymer-forming reactants or polymers employed in the present invention are usually in the form of the phosphonium chloride, they can be replaced by the analogous phosphate

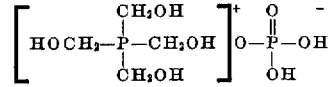

the acetate,

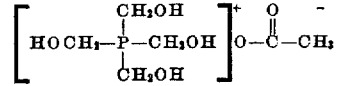

the hydroxide,

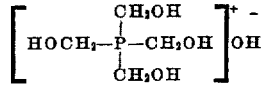

or the like phosphonium salt; and the phosphonium salt derivatives of THPC can be replaced by the analogous phosphonium salts of acids other than hydrochloric acid.

Where the polymeric mixtures provided by this invention are employed as textile flammability reducing agents, the textile can be impregnated with the bromine containing composition and then reimpregnated with the nitrilo methylol-phosphorus polymer or vice versa, or the bromine containing composition and the nitrilo methylol-phosphorus polymer can be incorporated into an organic or aqueous liquid, in the form of a solution, dispersion, emulsion, or suspension, and simultaneously applied to the textile by impregnating the textile with said liquid. The latter method comprises a preferred method of applying the polymer mixtures to textiles.

In general, whether the nitrilo methylol-phosphorus polymer and the bromine containing material are mixed before or after application to a textile, it is preferable to apply the nitrilo methylol-phosphorus polymer to the textile in the form of either a further polymerizable polymer or a mixture of nitrilo methylol-phosphorus resin forming reactants and insolubilizing the nitrilo methylol-phosphorus polymer in situ in the textile. Textiles impregnated with a liquid containing the nitrilo methylol-phosphorus resin forming materials are preferably dried by heating them to form about 60 to 125° C. for from about 2 to 15 minutes, with the lower temperature being used with the longer time, to evaporate volatile materials. The insolubilization of the nitrilo methylol-phosphorus resin forming materials can be accomplished thermally by heating the textiles containing them to a temperature of from about 125 to 170° C. for from about 2 to 15 minutes, with the lower temperature being used with the longer time. Alternatively, the insolubilization can be accomplished by reacting the resin forming materials in situ in the textile with ammonia, preferably by the process described in copending application Serial No. 393,021 filed November 18, 1953, now Patent No. 2,772,188.

The application of the polymeric mixtures provided by this invention to textiles can be accomplished by means of the usual procedures and apparatus for impregnating textiles with resinous materials. These mixtures can further be mixed with the usual textile softening, lustering, lubricating and the like textile treating agents.

The phosphorus compounds which can be used in the production of nitrilo methylol-phosphorus polymers for use in this invention comprise at least one member of the group THPC, THPO, and compounds derived from either of them which contain a plurality of the methylol-phosphorus groups of the parent compounds. These derivative phosphorus compounds are the products obtained by partially reacting THPC, THPO, or a mixture thereof, with either a mono- or polyfunctional methylol-reactive compound until some but not all of the methylol-phosphorus groups of THPC or THPO react. Such compounds can be monomers in which the methylol-phosphorus groups are attached to a single phosphorus atom or further polymerizable polymers in which some of the methylol-phosphorus groups are attached to different phosphorus atoms of the polymer molecules.

Illustrative examples of suitable polyfunctional methylol-reactive compounds which are capable of condensing with formaldehyde include: polyamines such as ethylenediamine, tetramethylenepentamine, and the like; alicyclic amines such as cyclohexylamine, cyclopentamine, methylolated cyclohexylamines, and the like; aromatic amines such as aniline, phenyldiamine, and the like; imines such as ethylenimine, and the homologs of the polymers of ethylenimine, and the like; compounds such as melamine or guanidine; amido compounds, such as urea, alkylated homologs and analogs thereof, acrylamide, cyanamide, and the like; amino acids such as glycine, lysine, arginine, and the like; and the bromine analogs of any such organic nitrilo compounds. These compounds can either be employed as the polyfunctional nitrogen compound or as a reactant for partial reaction with THPC or THPO to produce a nitrilo group containing derivative phosphorus compound.

Other suitable nitrilo group containing derivative phosphorus compounds can be produced by a similar partial reaction of THPC, THPO, or a mixture thereof with the analogous organic nitrilo compounds which contain only one member of the group H or $CH_2OH$ attached to a trivalent nitrogen atom. Illustrative examples of such monofunctional nitrilo compounds (monofunctional in they contain a single methylol reactive functional group) include: open chain polyamines such as N,N,N'-trimethyl ethylenediamine; alicyclic amines such as N-butyl cyclohexyl amine; aliphatic amines such as diethanolamine; amides such as N-allyl acrylamide; amino acids such as N-methyl glysine; and the bromo analogs of any such nitrilo compounds that contain at least one bromine atom attached to a carbon atom that is attached to another carbon atom.

Illustrative examples of polyfunctional methylol reactive compounds which are capable of condensing with formaldehyde also include: phenols, naphthols, and halo- and/or hydrocarbon-substituted phenols and naphthols such as phenol, vinylphenol, resorcinol, catechol, hydroquinone, phloroglucinol, para-tertiary-amylphenol, allylphenol, ortho-bromophenol, bromo-hydroquinone, 2,4-dibromo-1-naphthol, and the like.

Any of the above phenolic compounds can be partially reacted with THPC, THPO, or a mixture thereof to produce a monomeric or polymeric compound which is an aromatic group-containing derivative phosphorus compound containing at least two methylol-phosphorus groups and which is suitable for employment in the production of nitrilo methylol-phosphorus polymers.

Illustrative examples of polyfunctional methylol reactive compounds which are capable of esterifying methyl alcohol include: saturated aliphatic polycarboxylic acids, such as oxalic, malonic, methylsuccinic, malic, tartaric, citric and like acids; unsaturated aliphatic polycarboxylic acids, such as maleic, itaconic, aconitic and like acids; alicyclic polycarboxylic acids, such as pinic, homopinic, the hexahydrophthalic and like acids; aromatic polycarboxylic acids, such as the phthalic, the benzenetricarboxylic, diphenic, chlorendic, and like acids; polycarboxylic acid anhydrides, such as succinic, maleic, phthalic, chlorendic, and the like acid anhydrides; and polycarboxylic acid halides, such as oxalyl, succinyl, the phthalyl, and the like acid halides.

Any of the above polycarboxylic acid esterifying agents or their monocarboxylic acid analogs can be partially reacted with THPC, THPO or mixtures thereof to produce monomeric or polymeric derivative phosphorus compounds, containing ester groups and at least two methylol-phosphorus groups, which are suitable for employment in the production of nitrilo methylol-phosphorus polymers.

Free radical reaction initiators which can be used in the above described free radical initiated reactions between various polybromohydrocarbon and various unsaturated compounds include substantially any compounds which are susceptible to being decomposed to yield free radicals under the influence of heat, light, or fast elemental particles formed in the course of the reaction. Illustrative examples of such free radical reaction initiators include peroxides such as dibenzoyl peroxide, di-tertiary-butyl peroxide, hydrogen peroxide, alkali metal persulfates, benzoyl hydroperoxide, cumene hydroperoxide, and the like; azo compounds such as 2,2'-bisazo-isobutyronitrile; and ketones in conjunction with actinic light and the like reaction initiators. The peroxides, and, where the reaction is conducted in an aqueous emulsion reaction medium, the water soluble peroxides, are particularly preferred.

The following examples are illustrative of certain details of the present invention.

In the examples, the flame resistance of various resin impregnated cloths were compared by the "strip flame test" method. In this method a strip of the cloth, which is about half an inch wide and about 3 inches long, is supported at one end so that the strip extends toward some degree between 0 and 180 relative to a vertical azimuth. The unsupported ends of the cloth strips are ignited by contacting them with a flame until the cloth begins to burn. As soon as the cloth is ignited the flame used to ignite it is removed. The flammability of the cloths is compared on the basis that, when so supported and ignited, the cloths have a much greater tendency to burn when they are supported so that they extend straight down and are ignited at the bottom. Untreated cellulosic cloth will fail at 0 degrees (i. e. will burn when supported to extend straight up and ignited at the top). A very flame resistant cloth will pass at 180° (i. e. will not burn when supported to extend straight down and ignited at the bottom), while a relatively flame resistant cloth will not fail except at some angle between about 90 and 180 (i. e. when supported to extend downwardly so that the flame is propagated at least somewhat upwardly).

*Example 1*

A piece of 80 sq. print cloth was moistened with 10% solution of 2,3-dibromopropyl diester of $PNCl_2$ in acetone, then washed in hot water 10 minutes and dried 15 minutes in the oven at 110° C. The cloth had a gain in weight of 8.2%. It passed the 90° angle in the strip flame test. A portion of this sample was further treated with an aqueous solution containing 12% THPC, 7.7% Resloom HP and 5.7% urea to an additional resin pickup of 13.5% giving a total resin add-on of 21.7%. It passed the 180° angle in the strip flame test.

Another piece of 80 sq. print cloth was first treated with an aqueous solution containing 12% THPC, 7.7% Resloom HP and 5.7% urea to a final add-on of 13.5% resin. This sample passed the 120° angle in the strip flame test. A portion of this sample was further treated with a 10% acetone solution of the 2,3-dibromopropyl diester of $PNCl_2$ to an additional gain in weight of 6.9%. This was a total gain in weight of 20.4%. It passed the 180° angle in the strip flame test.

A sample of fabric treated with THPC resin alone to a THPC resin content of 21.6%, only passed the 135 to 140° angle in the strip flame test.

(Above data show synergistic effect of the combined treatment.)

*Example 2*

Samples of 80 sq. print cloth were treated with two concentrations of 2,3-dibromopropyl diester of $PNCl_2$ to give add-on of 9.5% and 5.8% respectively. These were further treated with an aqueous solution containing 12% THPC, 7.7% Resloom HP and 5.7% urea. Also, a sample of 80 sq. print cloth treated initially with an aqueous solution containing 12% THPC, 7.7% Resloom HP and 5.7% urea was further treated with an acetone solution of the diester.

The following table lists the data for these samples:

An aqueous solution was made containing 15.7% THPC, 10% Resloom HP, 10% urea and 3% triethanolamine.

A mixture of 2 parts of the $PNE-CHBr_3$ emulsion and 1 part of the THPC solution was used to pad 8 oz. twill to approximately 66% wet pickup. The twill was dried 10 minutes at 100° C. then cured 6 minutes at 140° C. After the fabric was washed and dried it had a resin add-on of 12.9%. The treated fabric passed the 135° angle in the strip flame test and almost passed the 180° angle in the strip flame test.

*Example 4*

Samples of 8.5 oz. sateen were treated with (1) the $PNE-CHBr_3$ adduct of Example 3, (2) THPC resin formulation (an aqueous solution containing 17.7% THPC, 11% Resloom HP and 8.8% urea), and (3) the THPC resin in combination with $PNE-CHBr_3$ adduct. After padding they were dried 10 minutes at 100° C., cured 6 min. at 140° C. then washed and dried. The following table lists the data.

| Sample designation | Treating solution | Wet pickup, percent | Final resin pickup, percent | Match test [1] |
|---|---|---|---|---|
| I | (A) $PNE-CHBr_3$ adduct | 76 | 15.1 | Failed. |
| II | (B) THPC resin | 67 | 15.9 | Do. |
| III | Mixture {(A) (B) / (50 : 50)} | 70 | 14.7 | Passed. |
| IV | Mixture {(A) (B) / (25 : 75)} | 68 | 15.4 | Do. |

[1] The match test consisted of igniting the bottom of a strip of fabric about ½ inch wide by about 4 inches long held in the vertical position in an essentially draft free room. If the strip ignites and continues to burn for even a few seconds after the flame is removed, it fails in the test. To pass the test the fabric may char in the region in or near the match flame but the burning ceases on the removal of the match.

*Example 5*

Samples of 8.5 oz. sateen and 8.0 oz. twill were treated with the $PNE-CHBr_3$ adduct of Example 3. Other samples of the fabrics were treated with a mixture containing 25 parts adduct emulsion and 75 parts THPC resin-forming solution (an aqueous solution containing 15.7% THPC, 10% Resloom HP, 10% urea and 3% triethanolamine). The fabrics were dried, cured and washed as in Examples 3 and 4. The following table lists data on the treated fabrics:

| Sample designation | Nature of sample | Treating solution | Wet pickup, percent | Final pickup, percent | Match test |
|---|---|---|---|---|---|
| A | Twill | ($PNE-CHBr_3$) Adduct | 66 | 13.0 | Failed. |
| B | Sateen | ($PNE-CHBr_3$) Adduct | 76 | 15.6 | Do. |
| C | Twill | Mixture 25:75 | 63 | 13.8 | Passed. |
| D | Sateen | Mixture 25:75 | 71 | 15.8 | Do. |

Sample D above was quite durable to laundering, and after 15 of the accelerated launderings the treated fabric passed the match test (described in Example 4).

| Sample designation | Treatment I | Treatment II | Strip flame test (angle), degrees | Tear strength, lbs. | Strength retention, percent | P, percent | Bromine, percent |
|---|---|---|---|---|---|---|---|
| 2189—19A | 9.5% diester | | 90 | 4.6 | 115 | | |
| —19B | 5.8% diester | | 45 | 4.5 | 112 | | |
| 2199—12 | 13.3% THPC resin | | 130 | 2.8 | 70 | 0.93 | 0.0 |
| —12A | 9.5% diester | 13.3% THPC resin | 180 | 3.1 | 77 | 1.53 | 5.60 |
| —12B | 5.8% diester | 13.3% THPC resin | 180 | 3.4 | 85 | 1.27 | 3.70 |
| —12D | 13.3% THPC resin | 5% diester | 180 | 3.0 | 75 | 1.37 | 3.04 |
| —12E | 13.3% THPC resin | 10% diester | 180 | 3.3 | 83 | 1.85 | 6.94 |
| 2186—10A | 21.6% THPC resin | | 140 | | | 1.74 | 0.0 |
| Control | | | | 4.0 | | | |

(The above data show the synergistic effect of the combination.)

*Example 3*

An emulsion containing 31% solids was prepared by reacting 1 part of an allyl neutral ester of a phosphonitrilic chloride (PNE) with 0.6 part bromoform ($CHBr_3$).

*Example 6*

A THPC resin formulation containing 38 parts THPC, 24 parts Resloom HP, 24 parts urea, 3 parts triethanolamine and 150 parts water was prepared. A sample of 8 oz. twill was padded with the above resin solution, dried 6 minutes at 100° C., cured 6 minutes at 140° C. then washed and dried. The final resin add-on was 16.4%. The sample passed the 135° angle in the strip flame test.

A mixture of 75 parts of the above THPC resin formulation and 25 parts of a triallyl phosphate bromoform adduct containing 1:0.6 molar ratio of TAP to CHBr₃ and approximately 40% solids content was prepared. A sample of twill was padded with this mixture, dried 6 minutes at 100° C., cured 6 minutes at 140° C. then washed and dried. The final resin add-on was 13.8% and this sample also passed the 135° angle in the strip flame test and appeared to be slightly better than the sample treated with THPC resin alone. However, the sample treated with the combination treatment had 2.6% less resin add-on than the sample treated with the THPC resin alone.

*Example 7*

Ten grams of 2.3 dibromopropyl neutral ester of $PNCl_2$ were dissolved in 10 grams chloroform and then emulsified with 10 grams of 2% aqueous polyvinyl alcohol solution. The emulsion was mixed with a THPC resin forming solution containing 19 grams THPC, 12 grams Resloom HP, 12 grams urea, 3 grams triethanolamine and 75 grams of water. A piece of 8 oz. twill and a piece of 8.5 oz. sateen were padded with the above mixture, dried 6 minutes at 100° C., cured 6 minutes at 140° C., and finally washed and dried. The following table summarizes the results:

| Sample designation | Nature of sample | Resin add-on, percent | Strip flame test (angle), degrees |
|---|---|---|---|
| A | Twill | 15.0 | 180 |
| B | Sateen | 14.2 | 180 |

A control THPC resin treated 8 oz. twill of 16.4% resin add-on passed the 135° angle in the strip flame test.

We claim:
1. A polymeric mixture comprising at least one nitrilo methylol-phosphorus polymer and a compound containing at least 10% of bromine in the form of bromine atoms attached to carbon atoms, said compound being selected from the group consisting of a polybromoalcohol ester of phosphonitrilic chloride, an addition product of a terminally unsaturated alkenol ester of phosphonitrilic chloride and a polybromo $C_{1-2}$ hydrocarbon containing at least two bromine atoms attached to the same carbon atom, an addition product of an N-alkenylated melamine and a polybromo $C_{1-2}$ hydrocarbon containing at least two bromine atoms attached to the same carbon atom, an addition product of an aliphatic acrylamide and a polybromo $C_{1-2}$ hydrocarbon containing at least two bromine atoms attached to the same carbon atom, and an addition product of a trialkenyl phosphate and a polybromo $C_{1-2}$ hydrocarbon containing at least two bromine atoms attached to the same carbon atom, the phosphorus in said nitrilo methylol-phosphorus polymer being contained in structures of the group consisting of $(-CH_2)_4PCl$ and $(-CH_2)_3PO$ in amounts to at least 0.5% of the total weight of the mixture, and from about 1 to 20 parts of nitrogen contained in nitrilo groups and from about 0.5 to 20 parts of bromine contained in the form of bromine atoms attached to carbon atoms being present per 1 part of phosphorus contained in said structure.

2. An organic textile treating agent comprising an aqueous liquid containing a mixture of at least one nitrilo methylol-phosphorus polymer and a compound containing at least 10% of bromine in the form of bromine atoms attached to carbon atoms, said compound being selected from the group consisting of a polybromoalcohol ester of phosphonitrilic chloride, an addition product of a terminally unsaturated alkenol ester of phosphonitrilic chloride and a polybromo $C_{1-2}$ hydrocarbon containing at least two bromine atoms attached to the same carbon atom, an addition product of an N-alkenylated melamine and a polybromo $C_{1-2}$ hydrocarbon containing at least two bromine atoms attached to the same carbon atom, an addition product of an aliphatic acrylamide and a polybromo $C_{1-2}$ hydrocarbon containing at least two bromine atoms attached to the same carbon atom, and an addition product of a trialkenyl phosphate and a polybromo $C_{1-2}$ hydrocarbon containing at least two bromine atoms attached to the same carbon atom, the phosphorus in said nitrilo methylol-phosphorus polymer being contained in structures of the group consisting of $(-CH_2)_4PCl$ and $(-CH_2)_3PO$ in amounts to at least 0.5% of the total weight of the mixture, and from about 0.5 to 20 parts of bromine contained in the form of bromine atoms attached to carbon atoms being present per 1 part of phosphorus contained in said structure.

3. In a process of reducing the flammability of an organic textile by impregnating the textile with a nitrilo methylol-phosphorus polymer produced by reacting at least one compound of the group consisting of $(HOCH_2)_4PCl$, $(HOCH_2)_3PO$ and the derivatives of either of them containing a plurality of residual $PCH_2OH$ groups of the parent compound with at least one organic nitrogen compound having a molecular weight of less than about 400 and containing at least one trivalent nitrogen atom and at least two members of the group consisting of H and $CH_2OH$ attached to trivalent nitrogen atoms, the improvement which comprises mixing with the nitrilo methylol-phosphorus polymer impregnant a compound containing at least about 10% of bromine in the form of bromine atoms attached to carbon atoms, said compound being selected from the group consisting of a polybromoalcohol ester of phosphonitrilic chloride, an addition product of a terminally unsaturated alkenol ester of phosphonitrilic chloride and a polybromo $C_{1-2}$ hydrocarbon containing at least two bromine atoms attached to the same carbon atom, an addition product of an N-alkenylated melamine and a polybromo $C_{1-2}$ hydrocarbon containing at least two bromine atoms attached to the same carbon atom, an addition product of an aliphatic acrylamide and a polybromo $C_{1-2}$ hydrocarbon containing at least two bromine atoms attached to the same carbon atom, and an addition product of a trialkenyl phosphate and a polybromo $C_{1-2}$ hydrocarbon containing at least two bromine atoms attached to the same carbon atom, to provide in the textile a mixed impregnant in which phosphorus in said nitrilo methylol-phosphorus polymer is contained in structures of the group consisting of $(-CH_2)_4PCl$ and $(-CH_2)_3PO$ in amounts to at least 0.5% of the total weight of the mixture, and in which from about 1 to 20 parts of nitrogen contained in nitrilo groups and from about 0.5 to 20 parts of bromine contained in the form of bromine atoms attached to carbon atoms are present per 1 part of phosphorus contained in said structure.

4. The process of claim 3 in which the bromine containing compound is an addition product of a neutral allyl ester of a phosphonitrilic chloride and bromoform.

5. The process of claim 3 in which the bromine containing compound is an addition product of triallyl phosphate and bromoform.

6. The process of claim 3 in which the bromine containing compound is a 2,3-dibromopropanol neutral ester of a phosphonitrilic chloride.

(References on following page)

References Cited in the file of this patent

UNITED STATES PATENTS

| | | |
|---|---|---|
| 2,574,515 | Walter et al. | Nov. 13, 1951 |
| 2,660,543 | Walter et al. | Nov. 24, 1953 |
| 2,668,096 | Reeves et al. | Feb. 2, 1954 |
| 2,681,295 | Hamalainen | June 15, 1954 |

OTHER REFERENCES

Little: Flameproofing Textile Fabrics (page 4) (1947). (Copy in Division 25.)

UNITED STATES PATENT OFFICE
CERTIFICATE OF CORRECTION

Patent No. 2,814,573                                                                                  November 26, 1957

Wilson A. Reeves et al.

It is hereby certified that error appears in the printed specification of the above numbered patent requiring correction and that the said Letters Patent should read as corrected below.

Column 11, line 69, for "$(C-CH_2)_4 PCl$" read -- $(-CH_2)_4 PCl$ --.

Signed and sealed this 9th day of June 1959.

(SEAL)
Attest:

KARL H. AXLINE
Attesting Officer

ROBERT C. WATSON
                                                                                                        Commissioner of Patents